United States Patent
Aoki et al.

(10) Patent No.: US 7,322,758 B2
(45) Date of Patent: Jan. 29, 2008

(54) PRINTING SYSTEM, PRINT REQUEST TERMINAL, COMPRESSION ALGORITHM SELECTING PROGRAM AND PRINTING METHOD

(75) Inventors: Mikio Aoki, Suwa (JP); Naruhide Kitada, Fujimi (JP); Toru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 195 days.

(21) Appl. No.: 11/332,875

(22) Filed: Jan. 13, 2006

(65) Prior Publication Data

US 2006/0112846 A1    Jun. 1, 2006

Related U.S. Application Data

(62) Division of application No. 10/915,123, filed on Aug. 10, 2004, now Pat. No. 7,111,556.

(30) Foreign Application Priority Data

Aug. 11, 2003 (JP) ............................. 2003-291655
May 20, 2004 (JP) ............................. 2004-150325

(51) Int. Cl.
*B41J 11/44* (2006.01)

(52) U.S. Cl. ............................ 400/76; 400/61; 400/62; 358/1.15

(58) Field of Classification Search ................. 400/61, 400/62, 70, 76; 358/1.15
See application file for complete search history.

(56) References Cited

U.S. PATENT DOCUMENTS

| | | | |
|---|---|---|---|
| 5,850,504 A | 12/1998 | Cooper et al. | |
| 6,184,997 B1 * | 2/2001 | Hanyu et al. | ............... 358/1.15 |
| 7,161,695 B2 * | 1/2007 | Ueda et al. | ................ 358/1.15 |
| 2003/0011819 A1 | 1/2003 | Toda | |
| 2007/0171459 A1 * | 7/2007 | Dawson et al. | ............ 358/1.15 |

FOREIGN PATENT DOCUMENTS

| | | |
|---|---|---|
| EP | 1 146 725 A2 | 10/2001 |
| EP | 1 146 725 A3 | 12/2002 |
| JP | 2003-029938 | 1/2003 |

OTHER PUBLICATIONS

Communication from European Patent Office re: related application. (Mar. 15, 2006).

* cited by examiner

*Primary Examiner*—Minh Chau
(74) *Attorney, Agent, or Firm*—Harness, Dickey & Pierce, P.L.C.

(57) ABSTRACT

A printing system is provided suitable for reducing a printing time. A client apparatus acquires document data being edited during an editing operation by an application, creates print data for evaluation based on the acquired document data, selects a compression algorithm suitable for the created print data for evaluation from a compression algorithm registration database, compresses print data in accordance with the selected compression algorithm, and sends the compressed print data to a printer along with a print request. The creation of print data for evaluation and the selection of a compression algorithm start during an editing operation by the application. When the printer receives compressed print data along with a print request, the printer decompresses the received compressed print data and prints based on the decompressed print data.

7 Claims, 11 Drawing Sheets

| | NUMBER OF TIMES OF PAST SELECTION |
|---|---|
| Haffman Encoding | 219 |
| 12-BIT VARIABLE LZW | 131 |
| 15-BIT VARIABLE LZW | 120 |
| ARITHMETIC SIGNS | 54 |
| | |

FIG. 2

| COMPRESSION ALGORITHM | COMPRESSION RATE [%] | | DATA TRANSFER TIME [s] | | DECOMPRESSING TIME [s] | |
| --- | --- | --- | --- | --- | --- | --- |
| | DOCUMENT DATA 1 | DOCUMENT DATA 2 | DOCUMENT DATA 1 | DOCUMENT DATA 2 | DOCUMENT DATA 1 | DOCUMENT DATA 2 |
| Haffman Encoding | 27.22 | 40.38 | 54.44 | 80.76 | 8.05 | 7.96 |
| ARITHMETIC SIGNS | 23.78 | 45.81 | 47.56 | 91.62 | 43.10 | 48.21 |
| 15-BIT VARIABLE LZW | 48.44 | 58.28 | 96.88 | 116.56 | 6.59 | 7.65 |
| 12-BIT VARIABLE LZW | 20.61 | 50.32 | 41.22 | 100.64 | 6.52 | 6.37 |

FIG. 3

| | APPLICATION 1 | APPLICATION 2 | APPLICATION 3 | OTHERS |
|---|---|---|---|---|
| Haffman Encoding | 102 | 54 | 50 | 13 |
| 12-BIT VARIABLE LZW | 53 | 48 | 20 | 10 |
| 15-BIT VARIABLE LZW | 108 | 8 | 0 | 4 |
| ARITHMETIC SIGNS | 18 | 20 | 15 | 1 |

PRINTING SYSTEM, PRINT REQUEST TERMINAL, COMPRESSION ALGORITHM SELECTING PROGRAM AND PRINTING METHOD

RELATED APPLICATIONS

This application is a divisional patent application of U.S. Ser. No. 10/915,123 filed Aug. 10, 2004, now U.S. Pat. No. 7,111,556 claiming priority to Japanese Patent Application Nos. 2003-291655 filed Aug. 11, 2003, and 2004-150325 filed May 20, 2004 which are hereby expressly incorporated by reference herein in their entirety.

BACKGROUND

The present invention relates to a printing system, print request terminal, compression algorithm selecting program and printing method for transferring and printing compressed print data between the print request terminal and a printer.

Various efforts have been made to reduce printing time, and increasing the speed of data transfer is one technique. In order to increase the speed of data transfer, a print data compressing method has been conventionally used. By compressing print data, an amount of transfer data is reduced so that the data transfer time can be reduced. The information processor disclosed in JP-A-2003-29938 is, for example, a technology relating thereto.

According to the invention disclosed in JP-A-2003-29938, in order to print compressed image data by JPEG (Joint Photographic coding Experts Group), for example, based on a scaling rate of a compressed image to be printed, processing power of a host computer and/or printer and a data transfer rate therebetween, a total processing time for creating and printing an uncompressed print image in the host computer side and a total processing time required for extending and printing in the printer side are estimated and compared. Based on the comparison result, the one requiring a shorter processing time is selected, and printing processing is performed thereon.

However, since an optimum method is determined in accordance with processing power of an entire system and/or a data transfer rate according to the invention disclosed in JP-A-2003-29938, the determination takes time though it is effective for the reduction of a print execution time (time from the receipt of print data by a printer to the completion of the printing) and the data transfer time. Therefore, in consideration of the time up to the determination time, the printing time (time from a print request by a user to the completion of the printing) may be larger than that of a case without the compressing method disclosed in JP-A-2003-29938 as a result, which is a problem.

The compression of print data is generally performed not only by the invention disclosed in JP-A-2003-29938 but also generally by a fixed compression algorithm. This is because dynamically (adaptively) determining an optimum compression algorithm requires time for calculation and may increase the printing time as a result.

However, since a compression algorithm's compression efficiency largely depends on the type of print data, sufficient compression efficiency cannot be achieved with a fixed compression algorithm, which is another problem. For example, when print data mainly includes images, a compression algorithm tailored to the compression of image data may be used. When print data mainly includes text, a compression algorithm tailored to the compression of text data may be used.

Accordingly, the invention was made in view of the unsolved problems of the conventional technologies. It is an object of the invention to provide a printer system, print request terminal, compression algorithm selecting program and printing method suitable for reducing printing time.

SUMMARY

In order to achieve the object, a printing system according to aspect 1 is a printing system in which a print request terminal for requesting printing and a printer for printing in response to a print request from the print request terminal are connected so as to communicate, the system characterized in that the print request terminal has a document data editing unit by which document data can be edited, a document data acquiring unit for acquiring document data while the document data is being manipulated by the document data editing unit, a print data creating unit for creating print data based on document data acquired by the document data acquiring unit, a compression algorithm selecting unit for selecting a compression algorithm suitable for print data created by the print data creating unit from multiple compression algorithms stored in a storing unit, a print data compression unit for compressing the print data in accordance with the compression algorithm selected by the compression algorithm selecting unit, and a compressed print data transmitting unit for transmitting print data compressed by the print data compressing unit to the printer, the printer has a compressed print data receiving unit for receiving the compressed print data, a print data decompressing unit for decompressing the compressed print data received by the compressed print data receiving unit, and a printing unit for printing based on the print data decompressed by the print data decompressing unit, and the selection by the compression algorithm selecting unit starts while the document data is being manipulated by the document data editing unit.

With the construction, in the print request terminal, when a user starts editing document data by the document data editing unit, a document data acquiring unit acquires document data being edited during an editing operation by the document data editing unit (the term, "edit" refers to a concept including "manipulate the document data by the document data editing unit" and the phrase, "during an editing operation", refers to a concept including "while the document data is being manipulated by the document data editing unit", hereinafter. These are true in the aspects relating to a print request terminal below, the aspects relating to a compression algorithm selecting program below and the aspects relation to a printing method below and embodiments of the invention, which will be described below), and a print data creating unit creates print data based on the acquired document data. A compression algorithm selecting unit selects a compression algorithm suitable for the created print data from multiple compression algorithms. The selection of a compression algorithm starts during an editing operation by the document data editing unit. When a compression algorithm is selected, a print data compression unit compresses the print data in accordance with the selected compression algorithm, and a compressed print data transmitting unit transmits compressed print data to the printer.

In the printer, when compressed print data is received by the compressed print data receiving unit, a print data decompressing unit decompresses the received compressed print data, and a printing unit prints based on the decompressed print data.

Thus, the following advantages can be obtained. Since a compression algorithm suitable for print data can be dynamically selected by the compression algorithm selecting unit, the compression efficiency can be improved and the data transfer time can be reduced. Furthermore, since the selection of a compression algorithm can be started during an editing operation by the document data editing unit, a part or all of the compression algorithm selecting processing can be performed before a user requests printing. Thus, a proportion of the printing time in a time required for compression algorithm selecting processing can be reduced. Therefore, the printing time can be further reduced than before.

Here, a compression algorithm suitable for print data refers to a compression algorithm suitable for reducing a printing time. For example, a compression algorithm maximizing a compression rate of print data, a compression algorithm minimizing a data transfer time and a compression algorithm minimizing a time for decompressing compressed print data are included therein. Since the compression algorithm is suitable for reducing a printing time, when print data is compressed by two different compression algorithms, the data transfer time and the decompression time are preferably increased and decreased, respectively, with the first compression algorithm. On the other hand, with the second compression algorithm, when the data transfer time and the decompression time are decreased and increased, respectively, a compression algorithm causing a sum of the data transfer time and the decompression time to be small is preferably selected. This is also true in the invention relating to the print request terminal below, the invention relating to the compression algorithm selecting program below and the invention relating to the printing method below.

The document data may be data including images, text and other elements to be edited, image data including only an image, or text data including only text. This is also true in the aspects relating to a print request terminal below, the aspects relating to a compression algorithm selecting program below and the aspects relating to a printing method below.

The document data acquiring unit may have any construction and only needs to acquire document data being edited during an editing operation by the document data editing unit. For example, the document data acquiring unit may acquire document data in a predetermined cycle during an editing operation by the document data editing unit. Alternatively, the document data acquiring unit may detect a manipulation by a user to the document data editing unit and acquire document data based on the detection result. In the latter case, the document data may be acquired by creating the document data being edited based on a detection result. This is also true in the aspects relating to a print request terminal below and the aspects relating to a compression algorithm selecting program below.

The print data compressing unit may have any construction and only needs to compress print data in accordance with a compression algorithm selected by the compression algorithm selecting unit. For example, print data created by the print data creating unit may be compressed. Alternatively, a second print data creating unit for creating print data based on document data edited by the document data editing unit may be provided, and print data created by the second print data creating unit may be compressed. This is also true in the aspects relating to a print request terminal below.

In a printing system of aspect 2 according to the printing system of aspect 1, the compression algorithm selecting unit compresses print data created by the print data creating unit in accordance with the compression algorithms for the compression algorithms, calculates compression rates of the print data based on the compression results, and selects a compression algorithm maximizing the calculated compression rate from the multiple compression algorithms.

With this construction, in a print request terminal, the compression algorithm selecting unit compresses created print data in accordance with the compression algorithms for the compression algorithms, calculates compression rates of the print data based on the compression results, and selects a compression algorithm maximizing the calculated compression rate from the multiple compression algorithms.

Thus, the following advantages can be obtained. Since a compression algorithm is selected based on the results from the trial of actual compressions with compression algorithms and a compression algorithm maximizing the compression rate of print data is selected, the compression efficiency can be further improved, and the data transfer time can be further reduced. Therefore, the printing time can be further reduced.

Here, the compression algorithm selecting unit compresses print data with each of the compression algorithms. However, the compression of print data does not require all of the compression algorithms and may only need to use some of the compression algorithms. This is also true in the aspects relating to a printing system below.

In a printing system of aspect 3 according to the printing system of aspect 1, the compression algorithm selecting unit compresses print data created by the print data creating unit in accordance with the compression algorithms for the compression algorithms, estimates processing times each including a time for transferring data to the printer and a decompressing time by the print data decompressing unit based on the compression results, and selects a compression algorithm minimizing the estimated processing time from the multiple compression algorithms.

With this construction, in the print request terminal, the compression algorithm selecting unit compresses created print data in accordance with the compression algorithms for the compression algorithms, estimates processing times each including a data transfer time and a decompressing time based on the compression results, and selects a compression algorithm minimizing the estimated processing time from the multiple compression algorithms.

Thus, the following advantages can be obtained. Since a compression algorithm can be selected based on the results from actual trials of compressions with compression algorithms, the compression efficiency can be improved and the data transfer time can be further reduced. Moreover, since a compression algorithm minimizing the processing time is selected, the data transfer time and decompression time can be reduced. Therefore, the printing time can be further reduced.

In a printing system of aspect 4 according to any one of aspects 2 and 3, the compression algorithm selecting unit selects the compression algorithms from the multiple compression algorithms, compresses the print data in accordance with each selected compression algorithm, and, when a print request is input, selects the compression algorithm based on the results of compressions performed until the input.

With this construction, in the print request terminal, the compression algorithm selecting unit selects the compression algorithms in a predetermined order from the multiple compression algorithms and compresses the print data in accordance with each selected compression algorithm.

When a print request is input from a user, the compression algorithm selecting unit selects the compression algorithm based on the results of compressions performed until the input.

Thus, compression algorithm selecting processing is not performed after a user requests printing. Therefore, a proportion of printing time in a time required for compression algorithm selecting processing can be further reduced. As a result, the printing time can be further reduced.

In a printing system of aspect 5 according to the printing system of aspect 4, the compression algorithm selecting unit stores selection history information indicating a selection history by the compression algorithm selecting unit in a selection history information storing unit and selects the compression algorithms in decreasing order of the number of times of selection by the compression algorithm selecting unit based on selection history information in the selection history information storing unit.

With this construction, in the print request terminal, when a compression algorithm is selected, the compression algorithm selecting unit stores selection history information indicating a selection history in a selection history information storing unit. The compression algorithm selecting unit selects the compression algorithms in decreasing order of the number of times of selection by the compression algorithm selecting unit based on selection history information in the selection history information storing unit.

Thus, since compressions are performed with compression algorithms in decreasing order of the number of times of the past selection, the compression efficiency is only slightly reduced even when the trial of compressions is interrupted by a print request from a user. Therefore, the data transfer time can be more securely reduced. As a result, the printing time can be further reduced.

In a printing system of aspect 6 according to the printing system of aspect 4, the print request terminal has multiple document data editing units, and the compression algorithm selecting unit stores selection history information indicating a history of selection by the compression algorithm selecting unit in the selection history information storing unit for the document data editing units and selects the compression algorithms in decreasing order of the number of times of selection by the compression algorithm selecting unit based on the selection history information of the selection history information storing unit with respect to one from which the document data is acquired among the multiple document data editing units.

With this construction, in the print request terminal, when a compression algorithm is selected, the compression algorithm selecting unit stores, for each of the document data editing units, selection history information indicating a history of selection in the selection history information storing unit for the document data editing units. The compression algorithm selecting unit further selects the compression algorithms in decreasing order of the number of times of selection by the compression algorithm selecting unit based on the selection history information of the selection history information storing unit with respect to one from which the document data is acquired among the multiple document data editing units.

Thus, the following advantages can be obtained. Print data edited by a document data editing unit may be similar. For example, when an image editing application is used as the document data editing unit, the document data mainly includes images. When a text editing application is used as the document data editing unit, the document data mainly includes text. Thus, when compression algorithms are tried for each of the document data editing units in decreasing order of the number of times of the past selection, like the invention, the data transfer time can be more securely reduced without much reduction of the compression rate even when the trial of the compressions is interrupted by a print request from a user. Therefore, the printing time can be further reduced.

On the other hand, in order to achieve the objects, a print request terminal of aspect 7 is a print request terminal including a document data editing unit by which document data can be edited, a document data acquiring unit for acquiring document data while the document data is being manipulated by the document data editing unit, a print data creating unit for creating print data based on document data acquired by the document data acquiring unit, a compression algorithm selecting unit for selecting a compression algorithm suitable for print data created by the print data creating unit from multiple compression algorithms stored in a storing unit, a print data compressing unit for compressing the print data in accordance with a compression algorithm selected by the compression algorithm selecting unit, and a compressed print data transmitting unit for transmitting print data compressed by the print data compressing unit to the printer, wherein the selection by the compression algorithm selecting unit starts while the document data is being manipulated by the document data editing unit.

With this construction, the same effects can be obtained as those of the print request terminal according to the printing system of aspect 1. Therefore, the same advantages can be obtained as those of the printing system of aspect 1.

In a print request terminal of aspect 8 according to the print request terminal of aspect 7, the compression algorithm selecting unit compresses print data created by the print data creating unit in accordance with the compression algorithms for the compression algorithms, calculates compression rates of the print data based on the compression results, and selects a compression algorithm maximizing the calculated compression rate from the multiple compression algorithms.

Thus, like aspect 2, the following advantages can be obtained. Since a compression algorithm is selected based on the results from the trial of actual compressions with compression algorithms and a compression algorithm maximizing the compression rate of print data is selected, the compression efficiency can be further improved, and the data transfer time can be further reduced. Therefore, the printing time can be further reduced.

Furthermore, in a print request terminal of aspect 9 according to the print request terminal of aspect 7, the compression algorithm selecting unit compresses print data created by the print data creating unit in accordance with the compression algorithms for the compression algorithms, estimates processing times each including a time for transferring data to the printer and a decompressing time by the print data decompressing unit based on the compression results, and selects a compression algorithm minimizing the estimated processing time from the multiple compression algorithms.

Thus, like aspect 3, the following advantages can be obtained. Since a compression algorithm can be selected based on the results from actual trials of compressions with compression algorithms, the compression efficiency can be improved and the data transfer time can be further reduced. Moreover, since a compression algorithm minimizing the processing time is selected, the data transfer time and decompression time can be reduced. Therefore, the printing time can be further reduced.

In a print request terminal of aspect 10 according to aspects 8 and 9, the compression algorithm selecting unit selects the compression algorithms from the multiple compression algorithms, compresses the print data in accordance with each selected compression algorithm, and, when a print request is input, selects the compression algorithm based on the results of compressions performed until the input.

Thus, like aspect 4, compression algorithm selecting processing is not performed after a user requests printing. Therefore, a proportion of printing time in a time required for compression algorithm selecting processing can be further reduced. As a result, the printing time can be further reduced.

In a print request terminal of aspect 11 according to the print request terminal of aspect 10, the compression algorithm selecting unit stores selection history information indicating a selection history by the compression algorithm selecting unit in a selection history information storing unit and selects the compression algorithms in decreasing order of the number of times of selection by the compression algorithm selecting unit based on selection history information in the selection history information storing unit.

Thus, like aspect 5, since compressions are performed with compression algorithms in decreasing order of the number of times of the past selection, the compression efficiency is only slightly reduced even when the trial of compressions is interrupted by a print request from a user. Therefore, the data transfer time can be more securely reduced. As a result, the printing time can be further reduced.

In a print request terminal of aspect 12 according to the print request terminal of aspect 10, the print request terminal has multiple document data editing units, and the compression algorithm selecting unit stores selection history information indicating a history of selection by the compression algorithm selecting unit in the selection history information storing unit for the document data editing units and selects the compression algorithms in decreasing order of the number of times of selection by the compression algorithm selecting unit based on the selection history information of the selection history information storing unit with respect to one from which the document data is acquired among the multiple document data editing units.

Thus, when compression algorithms are tried for each of the document data editing units in decreasing order of the number of times of the past selection, the data transfer time can be more securely reduced without much reduction of the compression rate like aspect 6 even when the trial of the compressions is interrupted by a print request from a user. Therefore, the printing time can be further reduced.

On the other hand, in order to achieve the objects, a compression algorithm selecting program of aspect 13 is a program for selecting a compression algorithm, the program causing a computer, which can use a document data editing unit to be used for editing document data, to implement processing to be performed by a document data acquiring unit for acquiring document data while the document data is being manipulated by the document data editing unit, a print data creating unit for creating print data based on document data acquired by the document data acquiring unit, and a compression algorithm selecting unit for selecting a compression algorithm suitable for print data created by the print data creating unit from multiple compression algorithms stored in a storing unit, wherein the selection by the compression algorithm selecting unit starts while the document data is being manipulated by the document data editing unit.

With this construction, when a program is read by a computer and processing is implemented by the computer in accordance with the read program, a document data acquiring unit acquires document data being edited during an editing operation by the document data editing unit, and a print data creating unit creates print data based on the acquired document data. Then, a compression algorithm selecting unit selects a compression algorithm suitable for the created print data from multiple compression algorithms. The selection of a compression algorithm starts during an editing operation by the document data editing unit.

Thus, since a compression algorithm suitable for print data can be dynamically selected, the compression efficiency can be improved and the data transfer time can be reduced. Furthermore, since the selection of a compression algorithm can be started during an editing operation by the document data editing unit, a part or the entire compression algorithm selecting processing can be performed before a user requests printing. Thus, a proportion of the printing time in a time required for compression algorithm selecting processing can be reduced. Therefore, the printing time can be further reduced than before.

In a compression algorithm selecting program of aspect 14 according to the compression algorithm selecting program of aspect 13, the compression algorithm selecting unit compresses print data created by the print data creating unit in accordance with the compression algorithms for the compression algorithms, calculates compression rates of the print data based on the compression results, and selects a compression algorithm maximizing the calculated compression rate from the multiple compression algorithms.

Thus, like aspect 2, the following advantages can be obtained. Since a compression algorithm is selected based on the results from the trial of actual compressions with compression algorithms and a compression algorithm maximizing the compression rate of print data is selected, the compression efficiency can be further improved, and the data transfer time can be further reduced. Therefore, the printing time can be further reduced.

Furthermore, in a compression algorithm selecting program of aspect 15 according to the compression algorithm selecting program of aspect 13, the compression algorithm selecting unit compresses print data created by the print data creating unit in accordance with the compression algorithms for the compression algorithms, estimates processing times each including a time for transferring data to the printer and a decompressing time by the print data decompressing unit based on the compression results, and selects a compression algorithm minimizing the estimated processing time from the multiple compression algorithms.

Thus, like aspect 3, the following advantages can be obtained. Since a compression algorithm can be selected based on the results from actual trials of compressions with compression algorithms, the compression efficiency can be improved and the data transfer time can be further reduced. Moreover, since a compression algorithm minimizing the processing time is selected, the data transfer time and decompression time can be reduced. Therefore, the printing time can be further reduced.

In a compression algorithm selecting program of aspect 16 according to the compression algorithm selecting program of aspects 14 and 15, the compression algorithm selecting unit selects the compression algorithms from the multiple compression algorithms, compresses the print data in accordance with each selected compression algorithm, and, when a print request is input, selects the compression algorithm based on the results of compressions performed until the input.

Thus, like aspect 4, compression algorithm selecting processing is not performed after a user requests printing. Therefore, a proportion of printing time in a time required for compression algorithm selecting processing can be further reduced. As a result, the printing time can be further reduced.

In a compression algorithm selecting program of aspect 17 according to the compression algorithm selecting program of aspect 16, the compression algorithm selecting unit stores selection history information indicating a selection history by the compression algorithm selecting unit in a selection history information storing unit and selects the compression algorithms in decreasing order of the number of times of selection by the compression algorithm selecting unit based on selection history information in the selection history information storing unit.

Thus, like aspect 5, since compressions are performed with compression algorithms in decreasing order of the number of times of the past selection, the compression efficiency is only slightly reduced even when the trial of compressions is interrupted by a print request from a user. Therefore, the data transfer time can be more securely reduced. As a result, the printing time can be further reduced.

In a compression algorithm selecting program of aspect 18 according to the compression algorithm selecting program of aspect 16, multiple document data editing units are provided, and the compression algorithm selecting unit stores selection history information indicating a history of selection by the compression algorithm selecting unit in the selection history information storing unit for the document data editing units and selects the compression algorithms in decreasing order of the number of times of selection by the compression algorithm selecting unit based on the selection history information of the selection history information storing unit with respect to one from which the document data is acquired among the multiple document data editing units.

Thus, when compression algorithms are tried for each of the document data editing units in decreasing order of the number of times of the past selection, the data transfer time can be more securely reduced without much reduction of the compression rate like aspect 6 even when the trial of the compressions is interrupted by a print request from a user. Therefore, the printing time can be further reduced.

Furthermore, a computer-readable storing medium recording a compression algorithm selecting program of aspect 19 is a computer-readable storing medium storing a program for selecting a compression algorithm, the program causing a computer, which can use a document data editing unit to be used for editing document data, to implement processing to be performed by a document data acquiring unit for acquiring document data while the document data is being manipulated by the document data editing unit, a print data creating unit for creating print data based on document data acquired by the document data acquiring unit, and a compression algorithm selecting unit for selecting a compression algorithm suitable for print data created by the print data creating unit from multiple compression algorithms stored in a storing unit, wherein the selection by the compression algorithm selecting unit starts while the document data is being manipulated by the document data editing unit.

With this construction, when a program stored in a storing medium is read by a computer and processing is implemented by the computer in accordance with the read program, a document data acquiring unit acquires document data being edited during an editing operation by the document data editing unit, and a print data creating unit creates print data based on the acquired document data. Then, a compression algorithm selecting unit selects a compression algorithm suitable for the created print data from multiple compression algorithms. The selection of a compression algorithm starts during an editing operation by the document data editing unit.

Thus, like aspect 13, since a compression algorithm suitable for print data can be dynamically selected, the compression efficiency can be improved and the data transfer time can be reduced. Furthermore, since the selection of a compression algorithm can be started during an editing operation by the document data editing unit, a part or the entire compression algorithm selecting processing can be performed before a user requests printing. Thus, a proportion of the printing time in a time required for compression algorithm selecting processing can be reduced. Therefore, the printing time can be further reduced than before.

On the other hand, in order to achieve the objects, a printing method of aspect 20 is a printing method in which a print request terminal for requesting printing and a printer for printing in response to a print request from the print request terminal are connected so as to communicate and printing is performed by using the print request terminal and the printer, the method including, in relation to the print request terminal, a document data acquiring step of acquiring document data while the document data is being manipulated by a document data editing unit, a print data creating step of creating print data based on document data acquired by the document data acquiring step, a compression algorithm selecting step of selecting a compression algorithm suitable for print data created by the print data creating step from multiple compression algorithms stored in a storing unit, a print data compression step of compressing the print data in accordance with the compression algorithm selected by the compression algorithm selecting step, and a compressed print data transmitting step of transmitting print data compressed by the print data compressing step to the printer, and, in relation to the printer, the method including a compressed print data receiving step of receiving the compressed print data, a print data decompressing step of decompressing the compressed print data received by the compressed print data receiving step, and a printing step of printing based on the print data decompressed by the print data decompressing step, wherein the selection by the compression algorithm selecting step starts while the document data is being manipulated by the document data editing unit.

Thus, the same advantages as those of the printing system of aspect 1 can be obtained.

Here, the document data acquiring step may be performed in any manner and simply needs to acquire document data being edited during an editing operation by the document data editing unit. For example, document data may be acquired in a predetermined cycle during an editing operation by the document data editing unit. Alternatively, a manipulation by a user to the document data editing unit may be detected, and document data may be acquired based on the detection result. In the latter case, the document data may be acquired by creating the document data being edited based on a detection result.

The print data compressing step may be performed in any manner and simply needs to compress print data in accordance with a compression algorithm selected by the compression algorithm selecting step. For example, print data created by the print data creating step may be compressed. Alternatively, a second print data creating step of creating print data based on document data edited by the document data editing unit may be provided, and print data created by the second print data creating step may be compressed.

In a printing method of aspect 21 according to the printing method of aspect 20, the compression algorithm selecting unit compresses print data created by the print data creating unit in accordance with the compression algorithms for the compression algorithms, calculates compression rates of the print data based on the compression results, and selects a compression algorithm maximizing the calculated compression rate from the multiple compression algorithms.

Thus, like aspect 2, the following advantages can be obtained. Since a compression algorithm is selected based on the results from the trial of actual compressions with compression algorithms and a compression algorithm maximizing the compression rate of print data is selected, the compression efficiency can be further improved, and the data transfer time can be further reduced. Therefore, the printing time can be further reduced.

Furthermore, in a printing method of aspect 22 according to the printing method of aspect 20, the compression algorithm selecting unit compresses print data created by the print data creating unit in accordance with the compression algorithms for the compression algorithms, estimates processing times each including a time for transferring data to the printer and a decompressing time by the print data decompressing unit based on the compression results, and selects a compression algorithm minimizing the estimated processing time from the multiple compression algorithms.

Thus, like aspect 3, the following advantages can be obtained. Since a compression algorithm can be selected based on the results from actual trials of compressions with compression algorithms, the compression efficiency can be improved and the data transfer time can be further reduced. Moreover, since a compression algorithm minimizing the processing time is selected, the data transfer time and decompression time can be reduced. Therefore, the printing time can be further reduced.

In a printing method of aspect 23 according to the printing method of aspects 21 and 22, the compression algorithm selecting unit selects the compression algorithms from the multiple compression algorithms, compresses the print data in accordance with each selected compression algorithm, and, when a print request is input, selects the compression algorithm based on the results of compressions performed until the input.

Thus, like aspect 4, compression algorithm selecting processing is not performed after a user requests printing. Therefore, a proportion of printing time in a time required for compression algorithm selecting processing can be further reduced. As a result, the printing time can be further reduced.

In a printing method of aspect 24 according to the printing method of aspect 23, the compression algorithm selecting unit stores selection history information indicating a selection history by the compression algorithm selecting unit in a selection history information storing unit and selects the compression algorithms in decreasing order of the number of times of selection by the compression algorithm selecting unit based on selection history information in the selection history information storing unit.

Thus, like aspect 5, since compressions are performed with compression algorithms in decreasing order of the number of times of the past selection, the compression efficiency is only slightly reduced even when the trial of compressions is interrupted by a print request from a user. Therefore, the data transfer time can be more securely reduced. As a result, the printing time can be further reduced.

In a printing method of aspect 25 according to the printing method of aspect 23, the print request terminal has multiple document data editing units, and the compression algorithm selecting unit stores selection history information indicating a history of selection by the compression algorithm selecting unit in the selection history information storing unit for the document data editing units and selects the compression algorithms in decreasing order of the number of times of selection by the compression algorithm selecting unit based on the selection history information of the selection history information storing unit with respect to one from which the document data is acquired among the multiple document data editing units.

Thus, when compression algorithms are tried for each of the document data editing units in decreasing order of the number of times of the past selection, the data transfer time can be more securely reduced without much reduction of the compression rate like aspect 6 even when the trial of the compressions is interrupted by a print request from a user. Therefore, the printing time can be further reduced.

BRIEF DESCRIPTION OF THE DRAWINGS

FIG. 2 is a diagram showing a data structure of a selection history information registration database 20.

FIG. 3 is a diagram showing a data structure of an evaluation result registration table 420.

FIG. 10 is a diagram showing a data structure of the selection history information registration database 20.

DETAILED DESCRIPTION

A first embodiment of the invention will be described below with reference to drawings.

FIGS. 1 to 8 are diagrams showing the first embodiment of a printing system, print request terminal, compression algorithm selecting program and printing method according to the invention.

Figure 1:
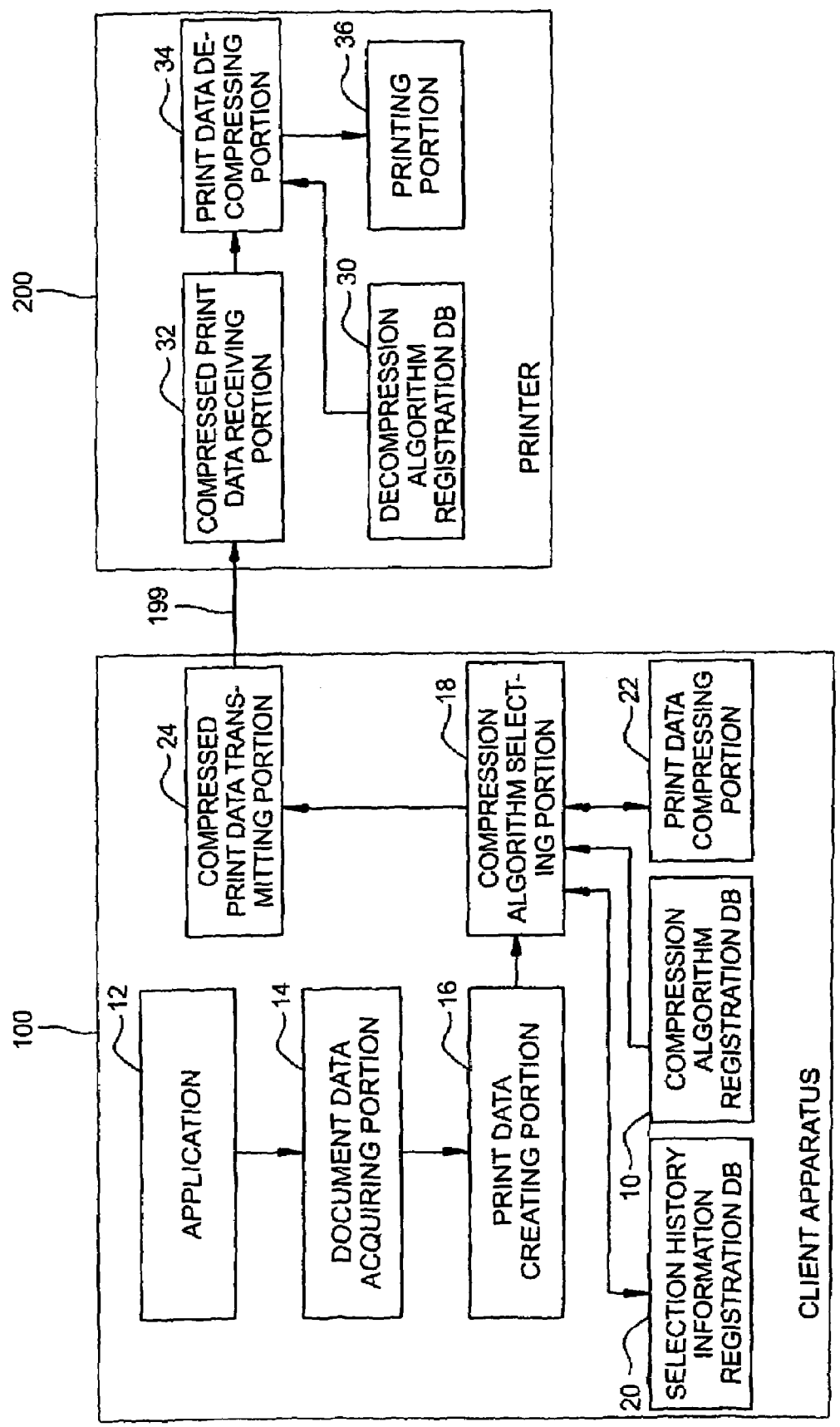
FIG. 1 is a functional and conceptual diagram showing an overview of a printing system applying the invention.

According to this embodiment, a printing system, print request terminal, compression algorithm selecting program and printing method according to the invention are applied for transferring and printing compressed print data between a client apparatus 100 and a printer 200 as shown in FIG. 1.

First of all, an overview of a printing system applying the invention will be described with reference to FIG. 1.

FIG. 1 is a functional and conceptual diagram showing the overview of the printing system applying the invention.

In FIG. 1, the client apparatus 100 which requests printing and the printer 200 which prints in response to a print request from the client apparatus 100 are connected over a network 199. For easier understanding of the invention, one client apparatus 100 and one printer 200 are shown. However, in reality, many client apparatuses 100 and printers 200 are connected over the network 199.

Next, a construction of the client apparatus 100 will be described in detail with reference to FIG. 1.

As shown in FIG. 1, the client apparatus 100 includes a compression algorithm registration database (simply abbreviated to DB, hereinafter) 10 with which multiple different compression algorithms are registered as program modules, an application 12, which can be used by a user to edit document data, a document data acquiring portion 14 for acquiring document data being edited during the editing operation by the application 12, a print data creating portion 16 for creating print data based on document data acquired by the document data acquiring portion 14, a compression algorithm selecting portion 18 for selecting a compression algorithm suitable for print data created by the print data creating portion 16 from the compression algorithm registration DB 10, and a selection history information registration database (DB) 20 with which selection history information indicating a selection history of the compression algorithm selecting portion 18 is registered.

The client apparatus 100 further includes a print data compressing portion 22 for compressing print data in accordance with a compression algorithm selected by the compression algorithm selecting portion 18 and a compressed print data transmitting portion 24 for transmitting print data compressed by the print data compressing portion 22 to the printer 200.

The document data acquiring portion 14 checks the activation state of the application 12. If activation is confirmed, document data being edited is acquired from the application 12. Various methods may be considered as a method for acquiring document data from the application 12, such as a method for capturing a GDI command of an OS (Operating System) upon starting the application 12, a method for capturing a rendering command and a method for acquiring file input/output data. However, the acquiring method according to this embodiment may be any method. The document data refers to data including an image, text and other editable elements.

The print data creating portion 16 creates print data for compression algorithm evaluation (called print data for evaluation, hereinafter) based on document data acquired by the document data acquiring portion 14.

FIG. 2 is a diagram showing a data structure of the selection history information registration DB 20.

As shown in FIG. 2, one record is registered with the selection history information registration DB 20 for each compression algorithm of the compression algorithm registration DB 10. Each record includes a field 402 with which a name of a compression algorithm is registered and a field 404 with which a number of time of past selection of a compression algorithm is registered.

In the example in FIG. 2, "Haffman Encoding" and "219" are registered with a record at the first row as a name of a compression algorithm and a number of times of past selection, respectively. This means that the compression algorithm called "Haffman Encoding" is used for compressing print data 219 times in the past.

The compression algorithm selecting portion 18 selects compression algorithms in decreasing order of the number of selecting times in the past from the compression algorithm registration DB 10 based on selection history information of the selection history information registration DB 20. The compression algorithm selecting portion 18 compresses print data for evaluation in accordance with each selected compression algorithm. Then, the compression algorithm selecting portion 18 calculates a compression rate of the print data for evaluation based on the compression result and estimates a data transfer time and decompression time of compressed print data. The evaluation result of the compression algorithm is created as an evaluation result registration table, for example.

FIG. 3 is a diagram showing a data structure of an evaluation result registration table 420.

As shown in FIG. 3, one record is registered with the evaluation result registration table 420 for each compression algorithm in the compression algorithm registration DB 10. Each record includes a field 422 with which a name of a compression algorithm is registered, a field 424 with which a compression rate of print data for evaluation is registered, a field 426 with which a data transfer time of compressed print data is registered, and a field 428 with which a decompression time of compressed print data is registered.

In the example in FIG. 3, with a record at the first row, "Haffman Encoding" as a name of a compression algorithm, "27.22" as a compression rate of Document Data 1, "40.38" as a compression rate of Document Data 2, "54.44" as a data transfer time of Document Data 1, "80.76" as a data transfer time of document data 2, "8.05" as a decompression time of Document Data 1, and "7.96" as a decompression time of Document Data 2 are registered. This means that, when print data for evaluation of Document Data 1 acquired by the document data acquiring portion 14 is compressed in accordance with the compression algorithm called "Haffman Encoding", the compression rate, the data transfer time and the decompression time are 27.22%, 54.44 s and 8.05 s, respectively. This further means that, when print data for evaluation of Document Data 2 acquired by the document data acquiring portion 14 is compressed in accordance with the compression algorithm called "Haffman Encoding", the compression rate, the data transfer time and the decompression time are 40.38%, 80.76 s and 7.96 s, respectively.

The compression algorithm selecting portion 18 discontinues the trial of compression if compression is being tried when a print request is input from a user. Based on the result of compressions performed before the input, the compression algorithm selecting portion 18 selects, from the compression algorithm registration DB 10, a compression algorithm maximizing the compression rate of print data for evaluation. By adding "1" to the number of times of selection of the selected compression algorithm, the selection history information is updated.

In accordance with the compression algorithm selected by the compression algorithm selecting portion 18, the print data compressing portion 22 compresses print data, which is created by a printer driver (not shown) in response to a request from the application 12.

Next, a more specific construction of the client apparatus 100 will be described in detail with reference to FIG. 4.

Figure 4:
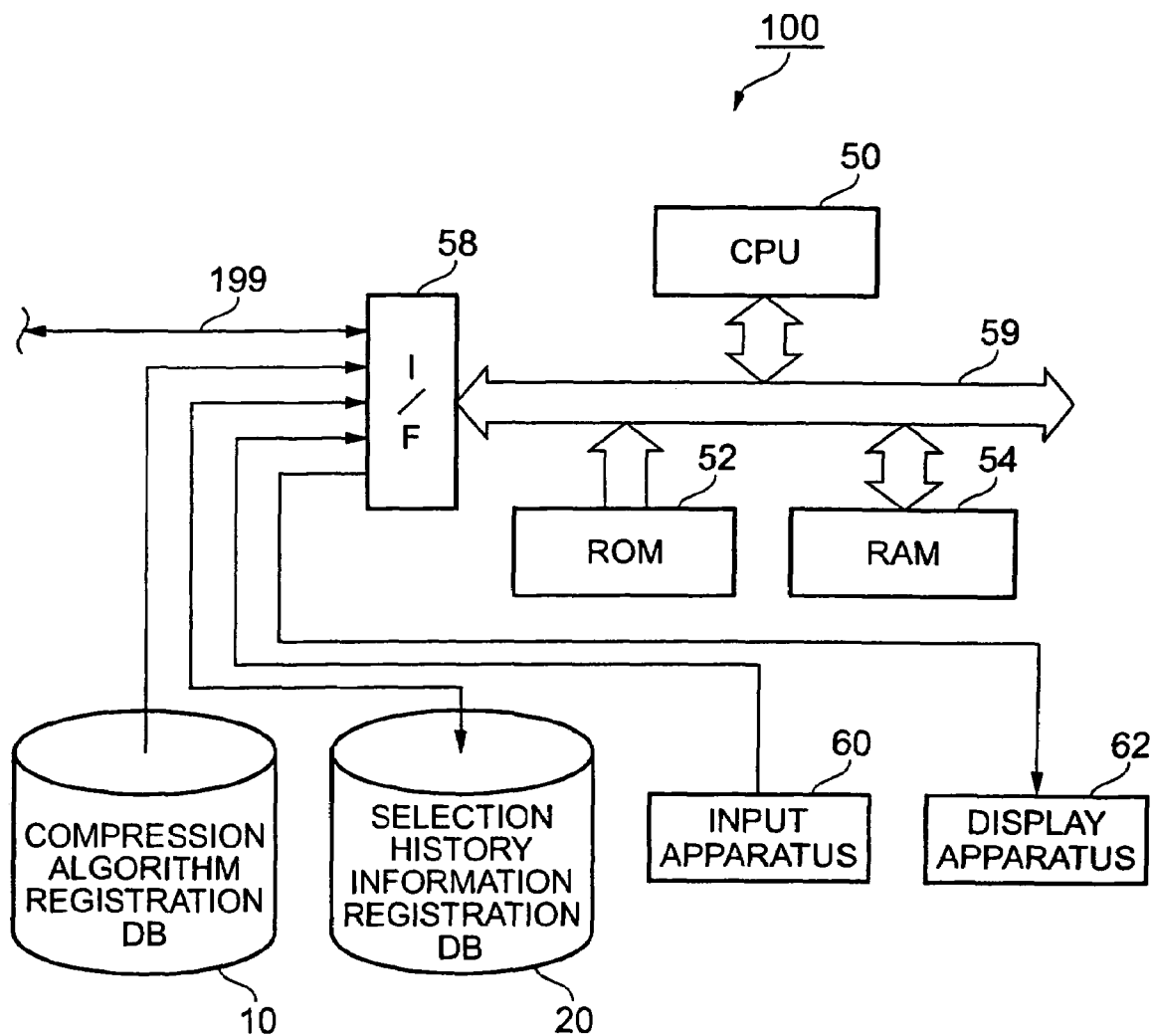
FIG. 4 is a block diagram showing a configuration of a client apparatus 100.

FIG. 4 is a block diagram showing a configuration of the client apparatus 100.

As shown in FIG. 4, the client apparatus 100 includes a CPU 50, a ROM 52, a RAM 54 and an I/F 58. The CPU 50 controls calculations and the entire system based on control programs. The ROM 52 stores control programs of the CPU 50 in predetermined areas in advance. The RAM 54 stores data read from the ROM 52 and so on and calculation results required for calculation processes in the CPU 50. The I/F 58 mediates data input/output from/to external apparatus. The CPU 50, ROM 52, RAM 54 and I/F 58 are connected through a bus 59 so as to exchange data. The bus 59 is a signal line for transferring data.

The I/F 58 is connected to a signal line for connecting to, as the external apparatus, an input apparatus 60, a display apparatus 62, the compression algorithm registration DB 10, the selection history information registration DB 20 and the network 199. The input apparatus 60 includes a keyboard, a mouse and/or the like through which data can be input as a human interface. The display apparatus 62 displays screens based on image signals.

The CPU 50 includes a micro-processing unit (MPU). The CPU 50 activates a predetermined program stored in a predetermined area of the ROM 52 and, in accordance with the program, executes compression algorithm selecting processing and print request processing shown in flowcharts in FIGS. 5 and 6.

First of all, the compression algorithm selecting processing will be described in detail with reference to FIG. 5.

Figure 5:
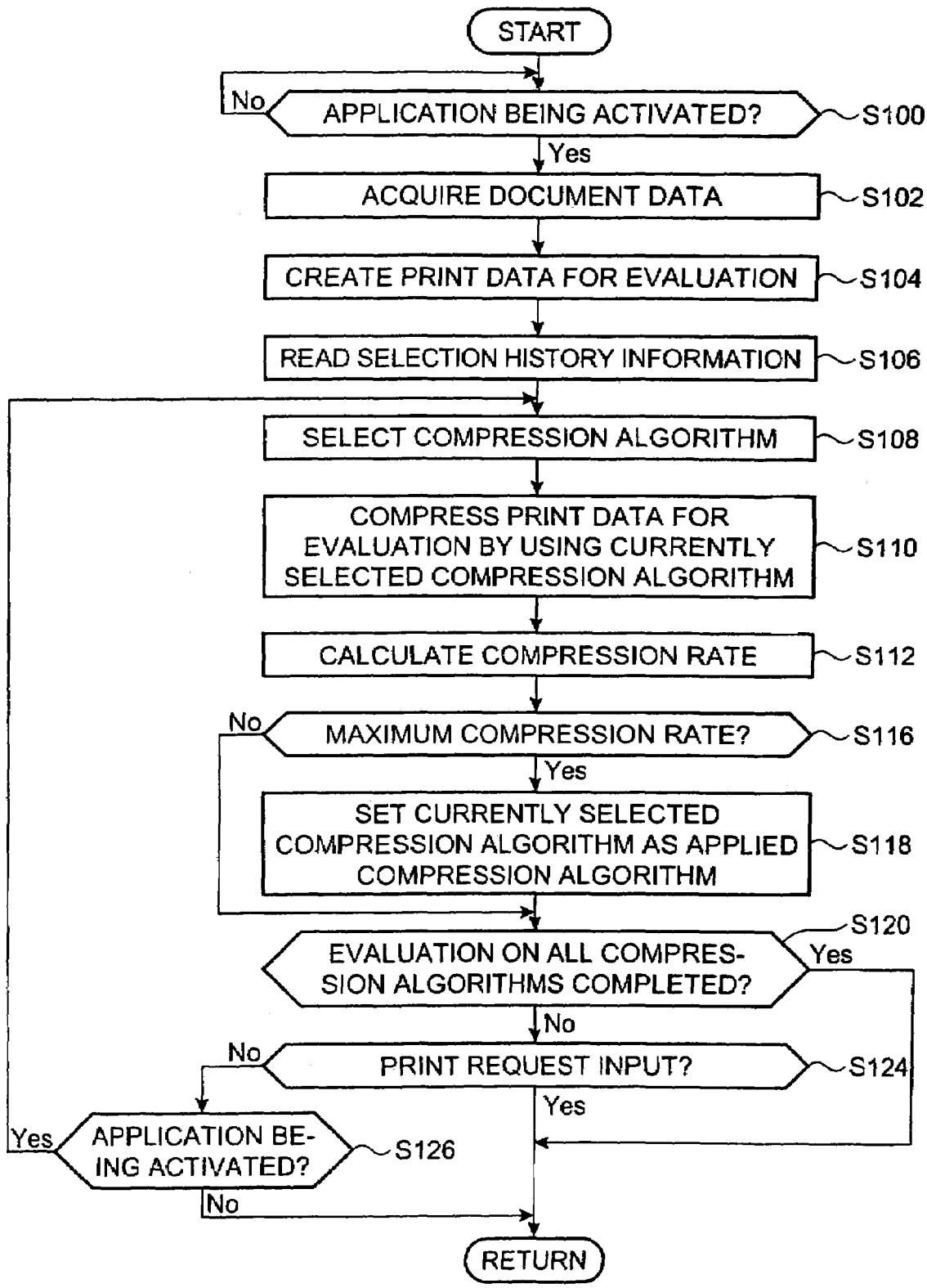
FIG. 5 is a flowchart showing compression algorithm selecting processing.

FIG. 5 is a flowchart showing compression algorithm selecting processing.

The compression algorithm selecting processing is processing to be implemented by the document data acquiring portion 14, the print data creating portion 16 and the compression algorithm selecting portion 18. Once the compression algorithm selecting processing is started in the CPU 50, the processing goes to step S100 first as shown in FIG. 5.

At step S100, whether the application 12 is activated or not is judged. If it is determined that the application 12 is activated (Yes), the processing goes to step S102. If not (No), the processing waits at step S100 until the application 12 is activated.

At step S102, document data being edited is acquired from the application 12. The processing goes to step S104 where print data for evaluation is created based on the acquired document data. The processing goes to step S106 where selection history information is read out from the selection history information registration DB 20. Then, the processing goes to step S108.

At step S108, based on the read selection history information, the most frequently selected compression algorithm among unevaluated compression algorithms is selected from the compression algorithm registration DB 10. The processing goes to step S110 where the print data for evaluation is compressed in accordance with the currently selected compression algorithm. The processing goes to step S112 where the compression rate of the print data for evaluation is calculated based on the compression result. Then, the processing goes to step S116.

At step S116, whether the calculated compression rate is at a maximum among compression rates having been calculated in the past or not is judged. If it is determined that the calculated compression rate is at the maximum (Yes), the processing goes to step S118 where the currently selected compression algorithm is set as an applied compression algorithm (compression algorithm used for compression of print data). Then, the processing goes to step S120.

At step S120, whether the evaluations for all compression algorithms in the compression algorithm registration DB 10 have completed or not is judged. If it is determined that the evaluations for all compression algorithms have completed (Yes), the processing ends and returns to the original step.

On the other hand, if it is determined at step S120 that evaluations for all compression algorithms in the compression algorithm registration DB 10 have not completed (No), the processing goes to step S124 where whether a print request from a user has been input through the input apparatus 60 or not is judged. If it is determined that a print request from the user has been input (Yes), the processing ends and returns to the original step.

On the other hand, at step S124, if it is determined that a print request from the user has not been input from the input apparatus 60 (No), the processing goes to step S126 where it is judged whether the application 12 is activated or not. If it is determined that the application 12 is not activated (No), the processing ends and returns to the original step.

On the other hand, if it is determined at step S126 that the application 12 is activated (Yes), the processing goes to step S108.

On the other hand, if it is determined at step S116 that the calculated compression rate is not at the maximum among compression rates having been calculated in the past (No), the processing goes to step S120.

Next, print request processing will be described in detail with reference to FIG. 6.

Figure 6:
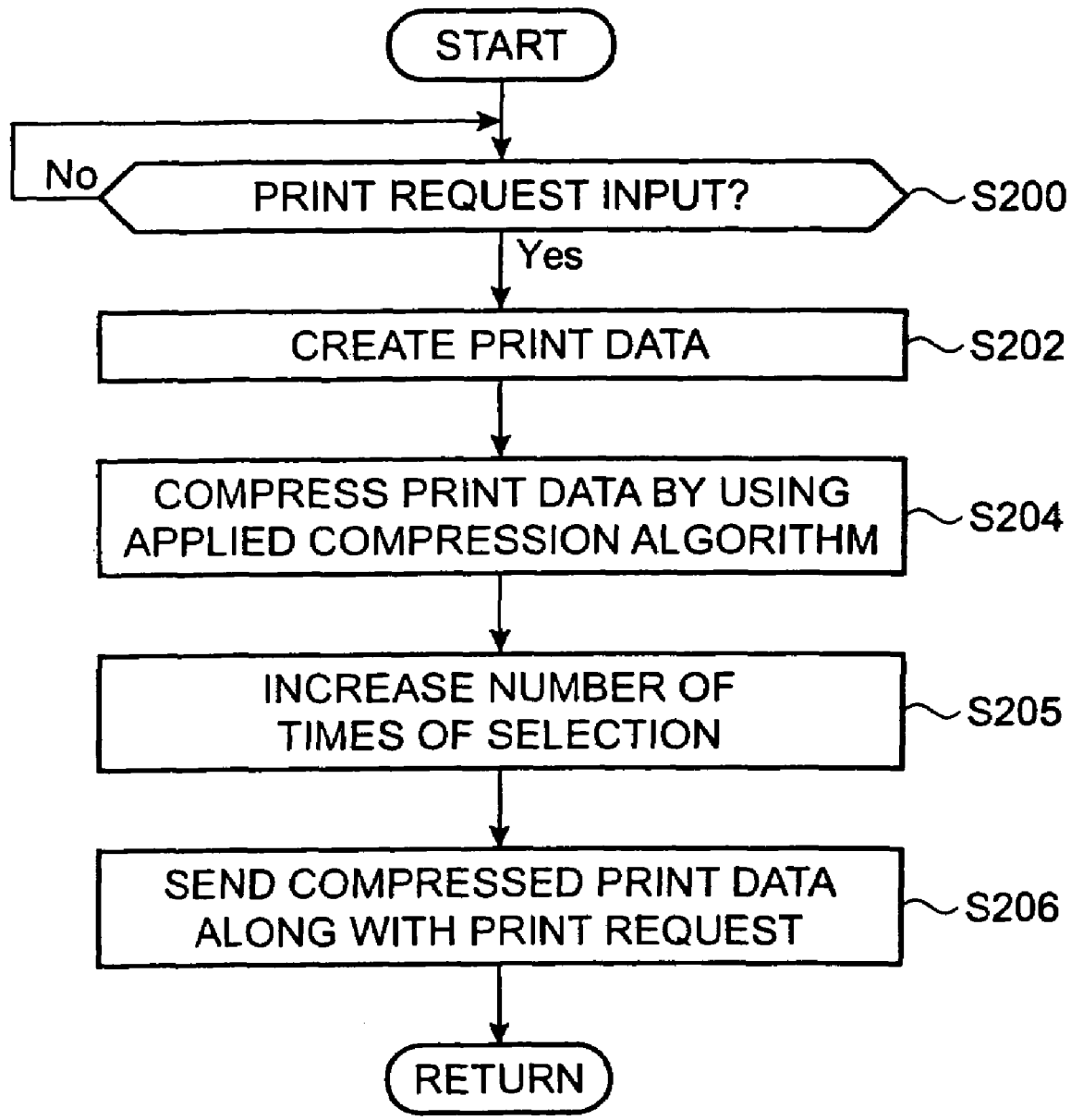
FIG. 6 is a flowchart showing print request processing.

FIG. 6 is a flowchart showing the print request processing.

The print request processing is processing to be implemented by the print data compressing portion 22 and the compressed print data transmitting portion 24. Once the print request processing is started in the CPU 50, the processing goes to step S200 first of all as shown in FIG. 6.

At step S200, whether a print request from a user has been input through the input apparatus 60 or not is judged. If it is determined that a print request from the user has been input (Yes), the processing goes to step S202. If not (No), the processing waits at step S200 until a print request from the user is input.

At step S202, the printer driver is activated, and print data is created by the printer driver based on document data of the application 12. The processing goes to step S204 where the created print data is compressed in accordance with the applied compression algorithm. Then, the processing goes to step S205.

At step S205, by adding "1" to the number of times of selecting the applied compression algorithm, the selection history information is updated. Then, the processing goes to step S206 where the compressed print data is transmitted to the printer 200 along with the print request. Then, the processing ends and returns to the original step. In order to decompress the compressed print data in the printer 200, the applied compression algorithm or reconstruction information relating to a decompression algorithm corresponding thereto are included in the compressed print data.

Next, a configuration of the printer 200 will be described in detail with reference to FIG. 1.

As shown in FIG. 1, the printer 200 includes a decompression algorithm registration database (DB) 30, a compressed print data receiving portion 32, a print data decompressing portion 34, and a printing portion 36. The decompression algorithm registration DB 30 with which multiple decompression algorithms corresponding to the compression algorithms in the compression algorithm registration DB 10 are registered as program modules. The compressed print data receiving portion 32 receives compressed print data. The print data decompressing portion 34 decompresses compressed print data received by the compressed print data receiving portion 32. The printing portion 36 prints based print data decompressed by the print data decompressing portion 34.

The print data decompressing portion 34 selects a decompression algorithm from the decompression algorithm registration DB 30 based on reconstruction information included in compressed print data received by the compressed print data receiving portion 32 and decompresses compressed print data in accordance with the selected decompression algorithm.

Next, a more specific construction of the printer 200 will be described in detail with reference to FIG. 7.

Figure 7:
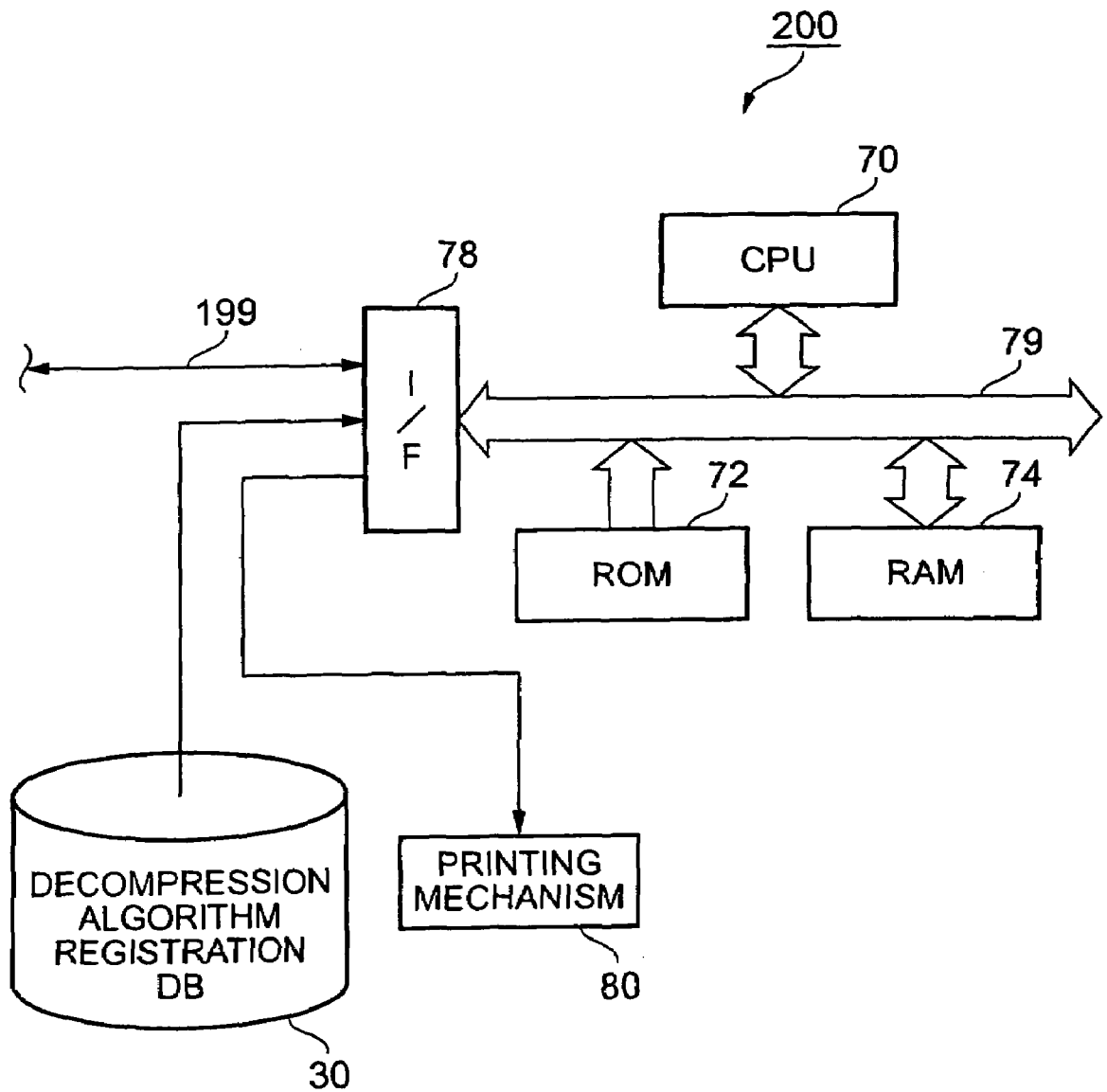
FIG. 7 is a block diagram showing a configuration of a printer 200.

FIG. 7 is a block diagram showing a configuration of the printer 200.

As shown in FIG. 7, the printer 200 includes a CPU 70, a ROM 72, a RAM 74 and an I/F 78. The CPU 70 controls calculations and the entire system based on control programs. The ROM 72 stores control programs of the CPU 70 in predetermined areas in advance. The RAM 74 stores data read from the ROM 72 and so on and calculation results required for calculation processes in the CPU 70. The I/F 78 mediates data input/output from/to external apparatus. The CPU 70, ROM 72, RAM 74 and I/F 78 are connected with each other through a bus 79 so as to exchange data. The bus 79 is a signal line for transferring data.

The I/F 78 is connected to a signal line for connecting to a signal line for connecting to, as the external apparatus, a printing mechanism 80 including a print head, a head driver portion and other mechanisms required for printing, a decompression algorithm registration DB 30 and the network 199.

The CPU 70 includes a micro-processing unit (MPU). The CPU 70 activates a predetermined program stored in a predetermined area of the ROM 72 and, in accordance with the program, executes print control processing shown in a flowchart in FIG. 8.

Figure 8:
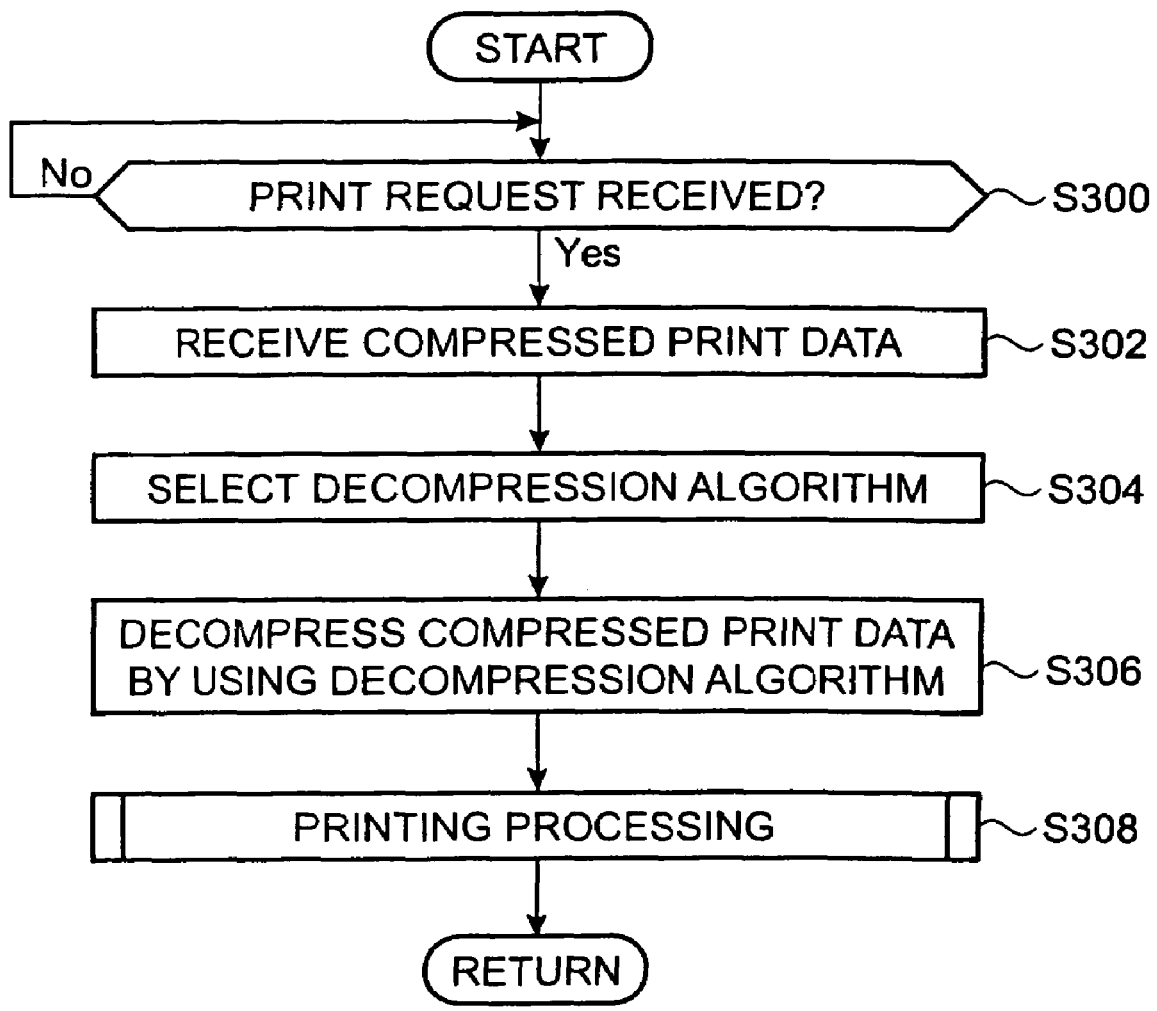
FIG. 8 is a flowchart showing print control processing.

FIG. 8 is a flowchart showing print control processing.

The print control processing is processing to be implemented by the compressed print data receiving portion 32, the print data decompressing portion 34 and the printing portion 36. Once the print control processing is started in the CPU 70, the processing goes to step S300 first as shown in FIG. 8.

At step S300, whether a print request has been received or not is judged. If it is determined that a print request has been received (Yes), the processing goes to step S302. If not (No), the processing waits at step S300 until a print request is received.

At step S302, compressed print data is received. Then, the processing goes to step S304 where a decompression algorithm is selected from the decompression algorithm registration DB 30 based on reconstruction information included in the received compressed print data. Then, the processing goes to step S306 where the compressed print data is expended in accordance with the selected decompression algorithm. Then, the processing goes to step S308 where printing processing for printing by controlling the printing mechanism 80 based on the decompressed print data is executed. Then, the processing ends and returns to the original step.

Next, an operation of this embodiment will be described.

In the client apparatus 100, at steps S102 to S106, once a user starts the application 12 and the application 12 starts editing document data, document data being edited is acquired from the application 12. Then, print data for evaluation is created based on the acquired document data, and selection history information is read out from the selection history information registration DB 20. Next, at steps S108 and S110 based on the read selection history information, the most frequently selected compression algorithm in the past among unevaluated compression algorithms is selected from the compression algorithm registration DB 10. Then, the print data for evaluation is compressed in accordance with the currently selected compression algorithm. At steps S112 and S116, a compression rate of the print data for evaluation is calculated based on the compression result, and whether the calculated compression rate is at a maximum among compression rates having been calculated in the past or not is judged. As a result, if it is determined that the compression rate is at the maximum, the currently selected compression algorithm is set as an applied compression algorithm at step S118.

The evaluation is performed on all compression algorithms in the compression algorithm registration DB 10. Thus, a compression algorithm having the maximum compression rate in the compression algorithm registration DB 10 is set as an applied compression algorithm.

When a user inputs a print request before the completion of the evaluation on the all compression algorithms, the trial of the compressions is interrupted. Thus, the one having a maximum compression rate among the compression algorithms having been evaluated before the print request is input is set as an applied compression algorithm.

On the other hand, in the client apparatus 100, once a user inputs a print request while the application 12 is being activated, the printer driver is started, print data is created by the printer driver based on document data of the application 12 and the created print data is compressed in accordance with the applied compression algorithm at steps S202 and S204. At steps S205 and S206, by adding "1" to the number of times of selecting the applied compression algorithm, the selection history information is updated. Then, compressed print data is sent to the printer 200 along with a print request.

In the printer 200, at steps S302 and S304, once the print request is received, the compressed print data is received, and a decompression algorithm is selected from the decompression algorithm registration DB 30 based on reconstruction information included in the received compressed print data. At steps S306 and S308, the compressed print data is decompressed in accordance with the selected decompression algorithm, and the printing mechanism 80 is controlled to print based on the decompressed print data.

In this way, according to this embodiment, the client apparatus 100 acquires document data being edited during an editing operation by the application 12, creates print data for evaluation based on the acquired document data, selects a compression algorithm suitable for the created print data for evaluation from the compression algorithm registration DB 10, compresses the print data in accordance with the selected compression algorithm and sends the compressed print data to the printer 200 along with a print request. The creation of print data for evaluation and the selection of a compression algorithm are started during an editing operation by the application 12.

Thus, since a compression algorithm suitable for print data can be dynamically selected, the compression efficiency can be improved and the data transfer time can be reduced. Furthermore, since the selection of a compression algorithm can be started during an editing operation by the application 12, a part or the entire compression algorithm selecting processing can be performed before a user requests printing. Thus, a proportion of the printing time in a time required for compression algorithm selecting processing can be reduced. Therefore, the printing time can be further reduced than before.

Furthermore, according to this embodiment, the client apparatus 100 compresses print data for evaluation for the compression algorithms in the compression algorithm registration DB 10 in accordance with the compression algorithms and calculates compression rates of the print data for evaluation based on the compression results. Thus, the client apparatus 100 selects a compression algorithm maximizing the calculated compression rate from the compression algorithm registration DB 10.

Thus, a compression algorithm can be selected based on the results from actual trials of compressions with compression algorithms, and a compression algorithm maximizing the compression rate of the print data for evaluation can be selected. Therefore, the compression efficiency can be improved, and the data transfer time can be further reduced. As a result, the printing time can be further reduced.

Moreover, according to this embodiment, the client apparatus 100 selects compression algorithms in a predetermined order from the compression algorithm registration DB 10 and compresses print data for evaluation in accordance with selected compression algorithms. When a user inputs a print request, a compression algorithm is selected based on the results from the compressions before the input.

Thus, compression algorithm selecting processing is not performed after a user requests printing. Therefore, a proportion of printing time in a time required for compression algorithm selecting processing can be further reduced. As a result, the printing time can be further reduced.

Furthermore, according to this embodiment, the client apparatus 100 updates selection history information of the selection history information registration DB 20 every time printing is performed. On the other hand, the client apparatus 100 selects compression algorithms in decreasing order of the number of times of past selection from the compression algorithm registration DB 10 based on the selection history information of the selection history information registration DB 20.

Thus, since compressions are performed in accordance with compression algorithms in decreasing order of the past selection frequencies, the compression efficiency is only slightly reduced even when the trial of compressions is interrupted by a print request from a user. Therefore, the data transfer time can be more securely reduced. As a result, the printing time can be further reduced.

Furthermore, according to this embodiment, the client apparatus 100 judges whether the application 12 is being activated or not during the evaluation operation of compression algorithms. If not, the compression algorithm selecting processing ends.

When the application 12 is not activated, the possibility that printing is performed is low. Thus, a necessity for continuing the evaluation operation on compression algorithms is low. Therefore, the processing load can be reduced by terminating the compression algorithm selecting processing.

According to the first embodiment, the client apparatus 100 corresponds to a print request terminal according to aspect 1 and 7 to 9. The application 12 corresponds to the document data editing unit according to aspect 1, 7 or 9. The document data acquiring portion 14 and step S102 correspond to the document data acquiring unit according to aspect 1, 7 or 8 or the document data acquiring step according to aspect 9. The print data creating portion 16 and step S104 correspond the print data creating unit according to aspect 1, 2, 7 or 8 or the print data creating step according to aspect 9. The compression algorithm selecting portion 18 and steps S106 to S120 and S205 correspond to the compression algorithm selecting unit according to aspect 1, 2, 4, 5, 7 or 8 or the compression algorithm selecting step according to aspect 9.

According to the first embodiment, the print data compression portion 22 and step S204 correspond to the print data compressing unit according to aspect 1 or the like or the print data compressing step according to aspect 20 or the like. The selection history information registration DB 20 corresponds to the selection history information storing unit according to aspect 5. The compressed print data transmitting portion 24 and step S206 correspond to the compressed print data transmitting unit according to aspect 1 or the like or the compression print data transmitting step according to aspect 20 or the like. The compressed print data receiving portion 32 and step S302 correspond to the compressed print data receiving unit according to aspect 1 or the compressed print data receiving step according to aspect 20 or the like. The print data decompressing portion 34 and steps S304 and S306 correspond to the print data decompressing unit according to aspect 1 or the print data decompressing step according to aspect 20 or the like.

According to the first embodiment, the printing portion 36 and step S308 correspond to the printing unit according to aspect 1 or the printing step according to aspect 20 or the like.

Next, a second embodiment of the invention will be described with reference to drawings.

Figure 9:
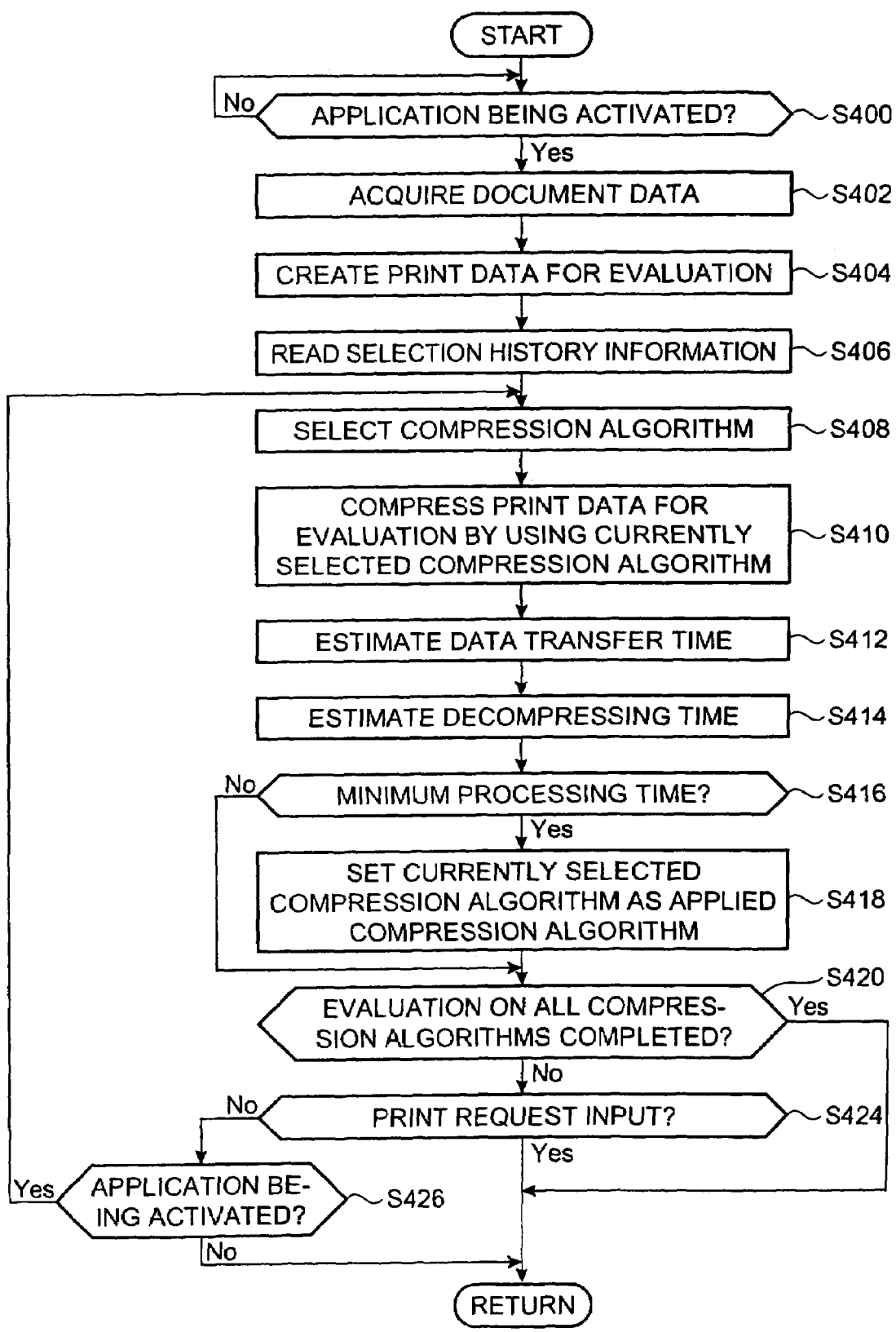
FIG. 9 is a flowchart showing compression algorithm selecting processing.

FIG. 9 shows a diagram showing the second embodiment of a printing system, print request terminal, compression algorithm selecting program and printing method according to the invention.

In this embodiment, a printing system, print request terminal, compression algorithm selecting program and printing method according to the invention are applied for transferring and printing compressed print data between a client apparatus 100 and a printer 200, as shown in FIG. 1. This embodiment is different from the first embodiment in that the data transfer time and the decompression time can be minimized. Only differences from the first embodiment will be described below, and the same reference numerals are given to the same components as those of the first embodiment, and the descriptions will be omitted herein.

A CPU 50 starts a predetermined program stored in a predetermined area of the ROM 52 and executes, in accordance with the program, compression algorithm selecting processing shown in a flowchart in FIG. 9 instead of the compression algorithm selecting processing shown in the flowchart in FIG. 5.

FIG. 9 is a flowchart showing the compression algorithm selecting processing.

Once the compression algorithm selecting processing is started in the CPU 50, the processing goes to step S400 first of all, as shown in FIG. 9.

From step S400 to step S410, steps corresponding to step S100 to step S110 in the flowchart in FIG. 5 are performed. Once step S410 ends, the processing goes to step S412.

At step S412, a data transfer time of compressed print data is estimated, and the processing goes to step S414 where a decompression time of the compressed print data is estimated. Then, the processing goes to step S416. For example, the data transfer time can be estimated based on data capacity after compression and a circuit capacity of a network 199. For example, the decompression time can be estimated based on a compression time required for compressing print data for evaluation and processing power of the printer 200.

At step S416, whether or not a sum of the estimated data transfer time and decompression time (called processing time, hereinafter) is at a minimum among processing times having been estimated in the past is judged. If it is determined that the estimated processing time is at the minimum (Yes), the processing goes to step S418 where the currently selected compression algorithm is set as an applied compression algorithm. Then, the processing goes to step S420.

Step S420 to step S426 corresponding to step S120 to step S126 in the flowchart in FIG. 5 are performed. Once the operations at steps S420, S424 and S426 end, the processing ends and returns to the original step.

On the other hand, at step S416, if it is determined that the estimated processing time is not at the minimum among processing times having been estimated in the past (No), the processing goes to step S420.

Next, an operation of this embodiment will be described.

In the client apparatus 100, at steps S402 to S406, once a user starts the application 12 and editing document data is started by the application 12, the document data in editing is acquired from the application 12, print data for evaluation is created based on the acquired document data, and selection history information is read out from the selection history information registration DB 20. Next, at steps S408 and S410, based on the read selection history information, a compression algorithm, which is the most frequently selected in the past, among unevaluated compression algorithms is selected from the compression algorithm registration DB 10. The print data for evaluation is compressed in accordance with the currently selected compression algorithm. At steps S412 to S416, the processing time for the compressed print data is estimated based on the compression result, and whether or not the estimated processing time is at a minimum among processing times having been estimated in the past is judged. As a result, if it is determined that the processing time is at the minimum, the currently selected compression algorithm is set as an applied compression algorithm at step S418.

The evaluation is performed on all compression algorithms in the compression algorithm registration DB 10. Thus, a compression algorithm minimizing the processing time in the compression algorithm registration DB 10 can be set as an applied compression algorithm.

When a user inputs a print request before the completion of the evaluation on all compression algorithms, the trial of compressions is interrupted. Thus, the one having a minimum processing time among the compression algorithms having been evaluated before the input of the print request is set as an applied compression algorithm.

On the other hand, in the client apparatus 100, at steps S202 and S204, once a user inputs a print request while the application 12 is being activated, the printer driver is started, print data is created by the printer driver based on document data of the application 12 and the created print data is compressed in accordance with the applied compression algorithm. At steps S205 and S206, by adding "1" to the number of times of selecting the applied compression algorithm, the selection history information is updated. Then, compressed print data is sent to the printer 200 along with a print request.

In the printer 200, at steps S302 and S304, once the print request is received, the compressed print data is received, and a decompression algorithm is selected from the decompression algorithm registration DB 30 based on reconstruction information included in the received compressed print data. At steps S306 and S308, the compressed print data is decompressed in accordance with the selected decompression algorithm, and the printing mechanism 80 is controlled to print based on the decompressed print data.

In this way, according to this embodiment, the client apparatus 100 compresses print data for evaluation for compression algorithms in the compression algorithm registration DB 10 in accordance with the compression algorithms and estimates processing time including the data transfer time and decompression time based on the compression results. Then, the client apparatus 100 selects a compression algorithm minimizing the estimated processing time from the compression algorithm registration DB 10.

Thus, since a compression algorithm is selected based on the results from the trial of actual compressions for compression algorithms, the compression efficiency can be further improved, and the data transfer time can be further reduced. Since a compression algorithm minimizing a processing time is selected, the data transfer time and decompression time can be reduced. Therefore, the printing time can be further reduced.

According to the second embodiment, the client apparatus 100 corresponds to a print request terminal according to aspect 1 or the like. The application 12 corresponds to the document data editing unit according to aspect 1 or the like. The document data acquiring portion 14 and step S402 correspond to the document data acquiring unit according to aspect 1 or the like or the document data acquiring step according to aspect 20 or the like. The print data creating portion 16 and step S404 correspond to the print data creating unit according to aspect 1 or the like or the print data creating step according to aspect 20 or the like. The compression algorithm selecting portion 18 and steps S406 to S420 and S205 correspond to the compression algorithm selecting unit according to aspect 1 or the like or the compression algorithm selecting step according to aspect 20 or the like.

According to the second embodiment, the print data compression portion 22 and step S204 correspond to the print data compressing unit according to aspect 1 or the like or the print data compressing step according to aspect 20 or the like. The selection history information registration DB 20 corresponds to the selection history information storing unit according to aspect 5. The compressed print data transmitting portion 24 and step S206 correspond to the compressed print data transmitting unit according to aspect 1 or the like or the compression print data transmitting step according to aspect 20 or the like. The compressed print data receiving portion 32 and step S302 correspond to the compressed print data receiving unit according to aspect 1 or the compressed print data receiving step according to aspect 20 or the like. The print data decompressing portion 34 and steps S304 and S306 correspond to the print data decompressing unit according to aspect 1 or the like or the print data decompressing step according to aspect 20 or the like.

According to the second embodiment, the printing portion 36 and step S308 correspond to the printing unit according to aspect 1 or the printing step according to aspect 20 or the like.

According to the first and second embodiments, selection history information indicating the number of selecting time of each compression algorithm for each compression algorithm is registered. Based on the selection history information in the selection history information registration DB 20, compression algorithms are selected in decreasing order of the numbers of times of past selection from the compression algorithm registration DB 10. The construction is not limited thereto. When multiple applications 12 are installed, selection history information indicating the number of times of selection of each of the applications 12 and compression algorithms can be registered, as shown in FIG. 2.

FIG. 10 is a diagram showing a data structure of the selection history information registration DB 20.

As shown in FIG. 10, one record is registered with the selection history information registration DB 20 for each of the compression algorithms in the compression algorithm registration DB 10. Each record includes a field 442 with which a name of a compression algorithm is registered, a field 444 with which a number of times of selecting the compression algorithm in the past for document data edited by Application 1 is registered, a field 446 with which a number of times of selecting the compression algorithm in the past for document data edited by Application 2 is registered, a field 448 with which a number of times of selecting the compression algorithm in the past for document data edited by Application 3 is registered, and a field 450 with which a number of times of selecting the compression algorithm in the past for document data edited by other applications is registered.

In the example in FIG. 10, with a record at the first row, "Haffman Encoding" as a name of a compression algorithm, "102" as a number of times of past selection by Application 1, "54" as a number of times of past selection by Application 2, "50" as a number of times of past selection by Application 3, and "13" as a number of times of past selection by other applications are registered. This means that the compression algorithm, "Haffman Encoding" is used 102 times in the past for document data by Application 1, 54 times in the past for document data by Application 2, 50 times in the past for document data by Application 3 and 13 times in the past for document data by the other applications.

The client apparatus 100 selects compression algorithms in decreasing order of the number of times of selection in the past from the compression algorithm registration DB 10 with respect to one from which document data is acquired among the multiple applications 12 based on selection history information of the selection history information registration DB 20.

Print data edited by a same application 12 may be similar. For example, when an image editing application is used as the application 12, the document data mainly includes images. When a text editing application is used as the application 12, the document data mainly includes text. Thus, when compression algorithms are tried for each of the applications 12 in decreasing order of the number of times of the past selection, the data transfer time can be more securely reduced without much reduction of the compression rate even when the trial of the compression is interrupted by a print request from a user. Therefore, the printing time can be further reduced.

In this case, the client apparatus 100 corresponds to the print request terminal according to aspect 6. The application 12 corresponds to the document data editing unit according to aspect 6. The compression algorithm selecting portion 18 and steps S106 to S120, S205 and S406 to S420 correspond to the compression algorithm selecting unit according to aspect 6. The selection history information registration DB 20 corresponds to the selection history information storing unit according to aspect 6.

Figure 11:
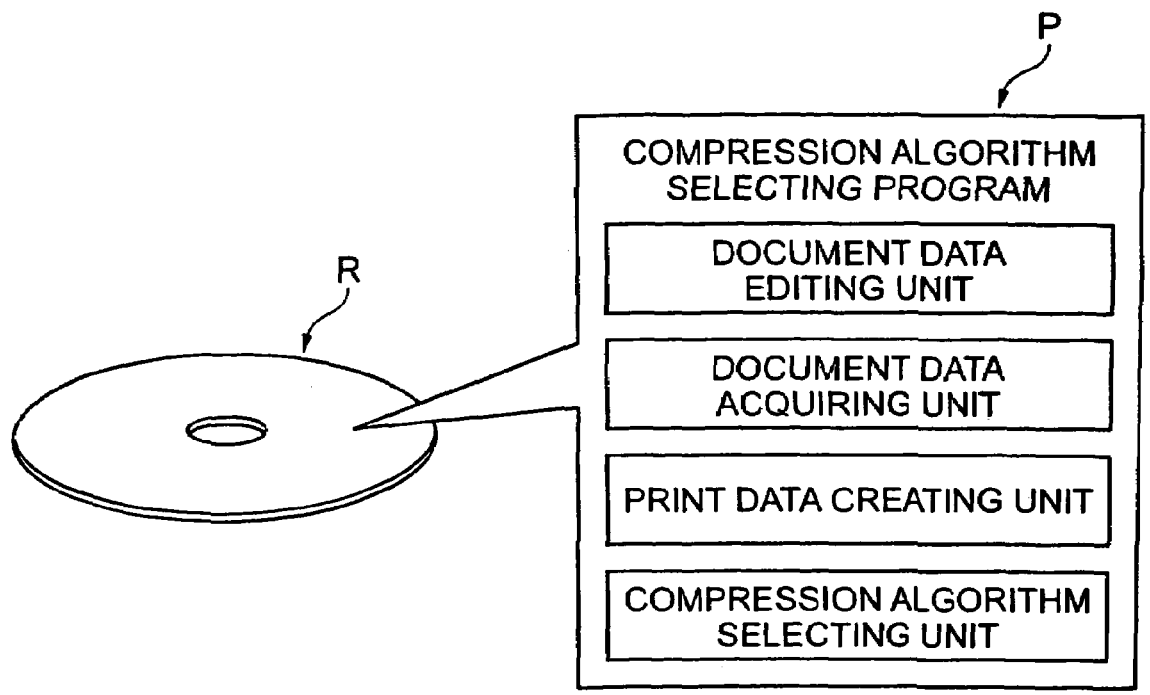
FIG. 11 is a conceptual diagram illustrating an example of computer-readable storage media storing programs.

According to the first and second embodiments, in order to execute processing shown in the flowcharts in FIGS. 5, 6, 8 and 9, control programs stored in the ROMs 52 and 72 in advance are executed. However, the invention is not limited thereto. For example, as shown in FIG. 11, the programs may be read from storage media R storing the programs for performing these steps to the RAMs 54 and 74 and be executed. FIG. 11 is a conceptual diagram illustrating an example of computer-readable storage media (CD-ROM) R storing different kinds of control program P.

Here, the storage media R may be semiconductor storage media such as a RAM and a ROM, magnetically writing storage media such as an FD and an HD, optically reading storage media such as a CD, a CDV, an LD and a DVD/optically reading storage media such as a MO and may be any storage media as far as the storage media is computer-readable regardless of the method of reading electronically, magnetically and optically.

According to the first and second embodiments, a printing system, print request terminal, compression algorithm selecting program and printing method according to the invention are applied to the case that compressed print data is transferred between the client apparatus 100 and the printer 200 and is printed as shown in FIG. 1, but the invention is not limited thereto. A printing system, print request terminal, compression algorithm selecting program and printing method according to the invention are applicable without departing from the spirit and scope of the invention. For example, the invention may be applied as follows:

First, the invention can be applied for performing image compression by an application using video information.

Second, the invention can be applied for selecting one of the multiple printers 200, which causes the shortest printing time in consideration of the transfer and processing power.

What is claimed is:

1. A print request terminal comprising:
document data editing means by which document data can be edited;
document data acquiring means for acquiring document data while the document data is being manipulated by the document data editing means;
print data creating means for creating print data based on document data acquired by the document data acquiring means;
compression algorithm selecting means for selecting a compression algorithm suitable for print data created by the print data creating means from multiple compression algorithms stored in storing means;
print data compressing means for compressing the print data in accordance with a compression algorithm selected by the compression algorithm selecting means; and
compressed print data transmitting means for transmitting print data compressed by the print data compressing means to the printer,
wherein the selection by the compression algorithm selecting means starts while the document data is being manipulated by the document data editing means.

2. A print request terminal according to claim 1, wherein:
the compression algorithm selecting means compresses print data created by the print data creating means in accordance with the compression algorithms for the compression algorithms, calculates compression rates of the print data based on the compression results, and selects a compression algorithm maximizing the calculated compression rate from the multiple compression algorithms.

3. A print request terminal according to claim 1, wherein:
the compression algorithm selecting means compresses print data created by the print data creating means in accordance with the compression algorithms for the compression algorithms, estimates processing times each including a time for transferring data to the printer and a decompressing time by the print data decompressing means based on the compression results, and selects a compression algorithm minimizing the estimated processing time from the multiple compression algorithms.

4. A print request terminal according to claim 2, wherein:
the compression algorithm selecting means selects the compression algorithms from the multiple compression algorithms, compresses the print data in accordance with each selected compression algorithm, and, when a print request is input, selects the compression algorithm based on results of compressions performed until the input.

5. A print request terminal according to claim 4, wherein:
the compression algorithm selecting means stores selection history information indicating a selection history of the compression algorithm selecting means in selection history information storing means and selects the compression algorithms in decreasing order of the number of times of selection by the compression algorithm selecting means based on selection history information in the selection history information storing means.

6. A print request terminal according to claim 4, wherein:
the print request terminal has multiple document data editing means, and
the compression algorithm selecting means stores selection history information indicating a history of selection by the compression algorithm selecting means in the selection history information storing means for the document data editing means and selects the compression algorithms in decreasing order of the number of times of selection by the compression algorithm selecting means based on the selection history information of the selection history information storing means with respect to one from which the document data is acquired among the multiple document data editing means.

7. A print request terminal comprising:
a document data editor adapted to edit document data;
a document data acquirer adapted to acquire document data while the document data is being manipulated by the document data editing means;
a print data creator adapted to create print data based on document data acquired by the document data acquirer;
a compression algorithm selector adapted to select a compression algorithm suitable for the print data created by the print data creator from multiple stored compression algorithms;
a print data compressor adapted to compress the print data in accordance with a compression algorithm selected by the compression algorithm selector; and
a compressed print data transmitter adapted to transmit print data compressed by the print data compressor to the printer,
wherein the selection by the compression algorithm selector starts while the document data is being manipulated by the document data editor.

* * * * *

UNITED STATES PATENT AND TRADEMARK OFFICE
CERTIFICATE OF CORRECTION

PATENT NO. : 7,322,758 B2
APPLICATION NO. : 11/332875
DATED : January 29, 2008
INVENTOR(S) : Akihito Uetake et al.

Page 1 of 1

It is certified that error appears in the above-identified patent and that said Letters Patent is hereby corrected as shown below:

Title Page, (*) Notice: Please insert --This patent is subject to a terminal disclaimer.--

Signed and Sealed this

Twenty-ninth Day of September, 2009

David J. Kappos
*Director of the United States Patent and Trademark Office*